March 28, 1944. E. J. NACHTWEY 2,345,062
AUTOMATICALLY ADJUSTABLE VEHICULAR BRAKE
Filed March 26, 1941 3 Sheets-Sheet 1

Inventor
EDWARD J. NACHTWEY.
By Nelson Moore
Attorney

March 28, 1944.  E. J. NACHTWEY  2,345,062
AUTOMATICALLY ADJUSTABLE VEHICULAR BRAKE
Filed March 26, 1941  3 Sheets-Sheet 2

Inventor
EDWARD J. NACHTWEY.
By Nelson Moore,
Attorney

March 28, 1944.  E. J. NACHTWEY  2,345,062
AUTOMATICALLY ADJUSTABLE VEHICULAR BRAKE
Filed March 26, 1941  3 Sheets-Sheet 3

Inventor
EDWARD J. NACHTWEY.
By John Moore
Attorney

Patented Mar. 28, 1944

2,345,062

UNITED STATES PATENT OFFICE 2,345,062

AUTOMATICALLY ADJUSTABLE VEHICULAR BRAKE

Edward J. Nachtwey, Green Bay, Wis.

Application March 26, 1941, Serial No. 385,344

12 Claims. (Cl. 188—79.5)

The present invention concerns improvements in hydraulic brakes and has for one of its objects the combination of the best features of both hydraulic and mechanical brakes in a single brake.

It is an object of the invention to provide a novel adjuster which maintains the lining at a predetermined distance from the drum at all times whereby even wear on the lining is obtained and the brake pedal movement for a given braking action is substantially constant.

It is an object of the invention to provide means for arresting and temporarily discontinuing the action of the adjuster when the drum is expanded abnormally due to heat.

It is an object of the invention to provide novel means for lengthening the shoe of the brake as wear may require.

It is an object of the invention to float support the shoe.

It is an object of the invention to provide mechanical means for operating the brake should the hydraulic means fail, said mechanical means being of independent action, but operated by the same pedal.

It is an object of the invention to provide novel pedal connecting means whereby a proper sequence of actions is determined.

Reference is had to my previous brake patents, No. 2,186,264, issued January 9, 1940, and No. 2,132,576, issued August 8, 1936, for closely related disclosures which will aid in fully understanding the present device.

Other objects will readily appear upon careful consideration of the drawings and specification which are to be taken as illustrative of one form the invention may take and are not to be construed as limiting.

In the drawings.

In the drawings like numerals refer to like parts throughout.

Figures 1, 2:
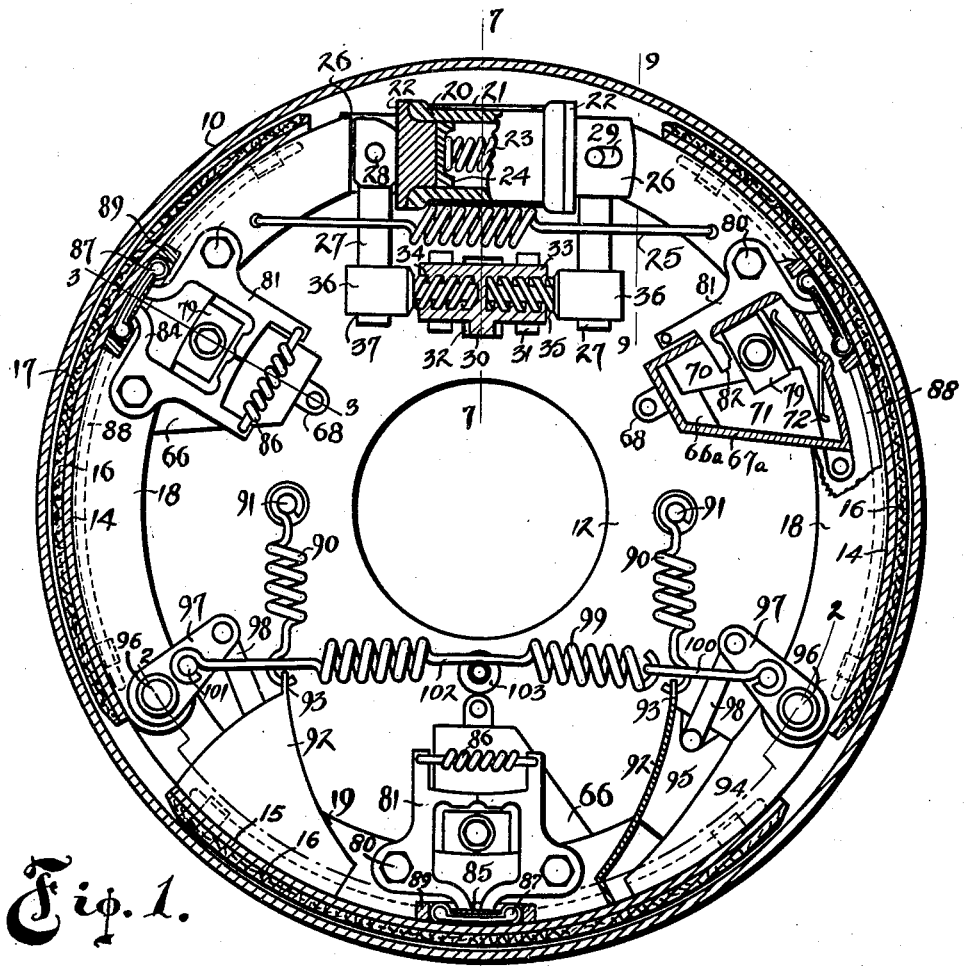
Figure 1 is a plan view partially sectional and partially broken away of the brake assembly.
Figure 2 is a section detail of the shoe lengthening mechanism.

A brake drum 10 is mounted on and turns with a wheel rotatably mounted on axle 11. A base plate 12 mates with drum 10 as at 13 where a reasonably effective dirt seal is provided with due allowance for running clearance.

Housed within drum 10 base plate 12 are shoes 14, one on each side, and a third shoe 15 at the bottom. The outer curved faces of all three shoes are provided with well known lining material 16 adapted to frictionally engage the inner surface of drum 10. A suitable running clearance 17 is provided between lining 16 and the inner surface of drum 10. It is this clearance 17 which the present invention maintains at a practical constant throughout the life of lining 16.

Shoes 14 have an inwardly extending webbing or flange portion 18. Shoe 15 is provided with a similar webbing or flange portion 19. Webbings 18 and 19 form T-shaped sections with their respective shoes which are strengthened thereby. In addition the webbings 18 and 19 serve as movable mounting means for certain portions of the invention.

An hydraulic cylinder 20 is firmly mounted on the upper part of base plate 12 between the upper ends of shoes 14 by carriage or blocks means 21 which may be bolted or otherwise fastened to base plate 12. A piston or plunger means 22 closes each end of cylinder 20 and slides therein. Within the cylinder is a compression spring 23 which bears on pillow blocks 24 also within cylinder 20 and resting against pistons 22.

A tension spring 25 draws together the upper ends of shoes 14. Springs 23 and 25 cooperate to eliminate loose play between the pistons 22 and shoes 14. The outer end of each piston 22 terminates in bifurcations 26 between which is mounted depending arm 27 by means of a pin 28. An elongate slot 29 is provided in bifurcations 26 to allow relative movement of arm 27 with respect thereto. The upper ends of shoes 14 extend between bifurcations 26 and contact the upper or head ends of arms 27.

Just below spring 25 is a lever 30 pivoted in mountings 31 attached to base plate 12 and extending through slot 32 therein.

The base or transverse portion 33 of lever 30 is internally threaded as at 34 to yield a cam action on threaded portions 35 of members 36 which are recessed at 37 to receive the lower portions of depending arms 27. Recesses 37 are elongate and may be open at the ends, arms 27 normally resting against the inner walls of the recesses. Threaded portions 34 and 35 are so arranged that clockwise or downward rotation of lever 30 will cause members 36 to move apart.

A conduit 38 connects cylinder 20 with master cylinder 39 in a fluid tight system. Brake pedal 40 is pivoted at 41 and is provided with a rearwardly projecting lug 42 to which is pivoted rod 43 leading to cylinder 39. Rod 43 may be connected with a reciprocating piston within cylinder 39 or one wall of the cylinder may be flexible as shown at 44. Clockwise rotation of pedal 40 about pivot 41 will be seen to raise rod 43 and force fluid from master cylinder 39 through conduits 38 to the cylinders 20 in each of the wheels. A counterclockwise tension return spring may be provided for pedals 40 if desired.

On lever portion 45 of pedal 40 and adjacent the pivot 41 is provided a projecting lug or the like 46 with a flat surface extending approximately radially from pivot 41. A second pivoted member 47 is likewise pivoted at 41 and has projecting therefrom a lug or the like 48 extending approximately radially from pivot 41 and having a flat upper surface adapted to be engaged by the similar flat surface on lug 46. Member 47 has downwardly and upwardly projecting lugs 49 and 50 attached thereto. Lug 50 has a relatively slenderer portion 51 which extends farther from pivot 41 than does lug 49 and has an apertured projection 52 mounted adjacent one edge thereof. Tension rod 53 slides freely through projection 52 until stop 54 mounted on its end engages projection 52. Rod 53 is pivoted at its other end to lever 65 which will serve as an emergency or parking brake lever.

Cables 55 are pivoted to lugs 49 and 50 of member 47. One cable 55 leads to the rear wheels and the other to the front pair. The usual lever type of equalizing device, not shown, may be employed between the wheels of each pair. Cables 55 are well graphited and lead through pipes 56 which are held in place by standards 57. Cable 55 leads over around pulley 58 pivoted on trunnion 59 mounted on axle 60. Portion 61 of cable 55 ends in a loop 62 which rests in depression 63 of lever 30.

It will be noted that the center line of cable 55 where it leaves the pulley 58 and extends toward lever 30 lies on the axis or center line of king pin 64 which arrangement permits the free turning of the wheel without affecting the tension in cable 55 or its braking action. The center of depression 63 need not depart from the axis of king pin 64 a greater distance than the radius of cable 55. If desired a sprocket may be substituted for pulley 58 and a chain for portion 61 of cable 55.

As the lining 16 wears the running clearance 17 would increase requiring increased movement of pedal 40 or lever 65 for adequate braking. Of greater importance is the tendency of linings to wear unevenly and the clearance 17 tending to become greater at some spots than others.

This defect is corrected by my adjuster which employs some of the principles disclosed in my two patents supra.

Figure 3:
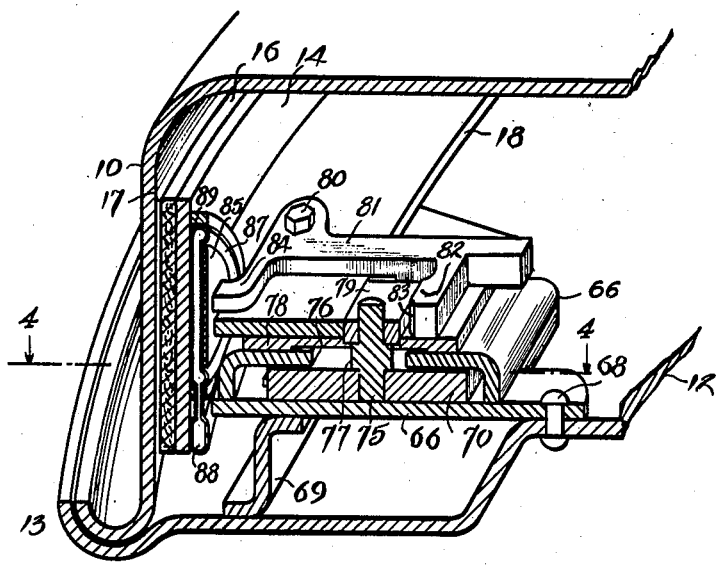
Figure 3 is a fragmentary oblique elevation of an adjuster assembly shown in section along line 3—3 in Figure 1.
Figure 4:
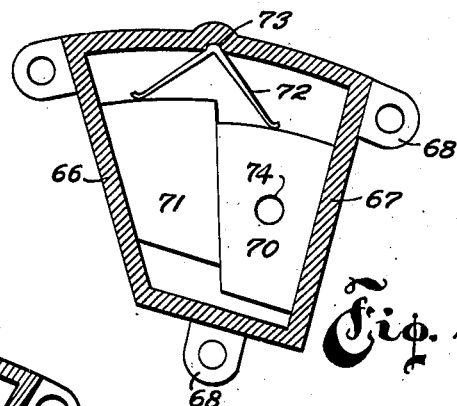
Figure 4 is a horizontal sectional view taken on section line 4 of Fig. 3, showing one form of adjuster wedge arrangement.
Figure 5:
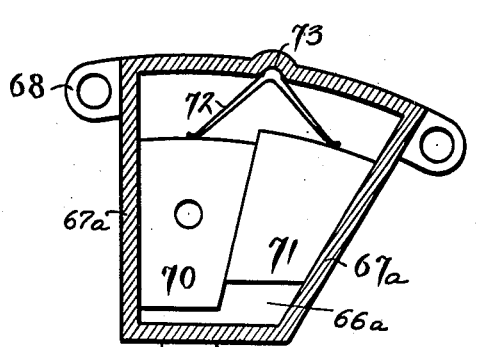
Figure 5 is a view similar to Fig. 4 of another form of adjuster wedge arrangement.

One adjuster is used for each of the three brake shoes, 14, 14 and 15, and it is convenient to utilize two different forms of housings for the same, which are relatively left and right handed in form as shown in Figs. 4 and 5 and are designated respectively as a whole by numerals 66 and 66a. The left-hand form 66 is used for the left-hand shoe 14 in Fig. 1, shown also in Fig. 3, and for the lower shoe 15, while the right-hand form 66a is used for the right-hand shoe 14, Fig. 1.

Each form of adjuster housing is wedge-shaped with upstanding walls 67 or 67a mounted on base plate 12 and secured in position by suitable means 68 and 69. Each housing 66 or 66a is so positioned that the converging portion is directed toward the center of base plate 12. Within each housing are two wedge members 70 and 71 slidable on the bottom, against the converging sides thereof and against each other. The same forms of wedges 70 and 71 are used in either form of housing, but they are placed reverse side up in the right and left-hand housings. A bifurcated spring 72 is pivoted at 73 in the curved outer wall of each housing and urges both wedges 70 and 71 toward the converging portion of each. The relationship of the wedges 70 and 71 is such that as wedge 70 is moved away from the point of convergence wedge 71 is moved toward it under the action of bifurcated spring 72 and the return of wedge 70 is prevented. Wedge 70 has a hole 74 therethrough substantially at its center of gravity in which is mounted bolt member 75 which may be driven or threaded into place. Bolt member 75 extends through a hole 76 in the top of housing 66 at which point it has an enlarged portion 77. Hole 76 is of sufficient size to allow free movement of bolt member 75 toward drum 10. A cover plate 78 fits snugly around bolt 75 and over hole 76 in sliding relation with the top of housing 66 to exclude dirt and the like.

Around the top of bolt 75 is a rectangular member 79 which rests on enlarged portion 77, bears against webbing 18 and slides on cover plate 78. Member 79 may be held in place by a nut or the like as shown. A lever arm 81 is pivoted at 80 to webbing 18 and has an extension 82 which curves around adjacent to the side of member 79 removed from webbing 18. The end 83 of extension 82 is spaced from the member 79 a distance substantially equivalent to clearance 17 as is shown in Fig. 3. A second extension 84 projects from the body of lever 81 and is held firmly against plate 85 by spring 86. Plate 85 is mounted on thermostatic bellows member 87 which is connected by a suitable conduit to heat absorber 88 containing a quantity of ether or material having similar desirable thermo-physical properties. Thermostatic bellows member 87 is held in place by ring 89 welded or otherwise attached to shoe 14. Absorber 88 rests snugly against shoe 14 in intimate heat exchange relation therewith and extends around nearly the entire length of the shoe. Each shoe normally has its own absorber and each adjuster has its own bellows member.

Lower shoe 15 is supported resiliently by springs 90 anchored at 91 to base plate 12. Housings 92 are located each end of shoe 15 and are provided with upstanding ears 93 to which one end of each of springs 90 is attached. Fitted within housings 92 are wedges 94 and 95 which rest against each other and the walls of housing 92 in sliding relation. Wedges 94 are pivoted at 96 to the lower ends of each of shoes 14. Wedges 95 are likewise connected to pivot 96 by levers 97 and links 98.

Figure 6:
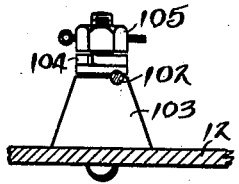
Figure 6 is an elevation of a spring support detail.
Figure 9:
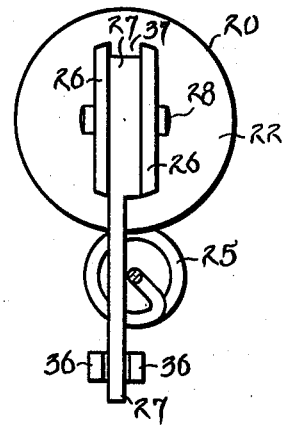
Figure 9 is a section detail along line 9—9 of Figure 1.
Figure 7:
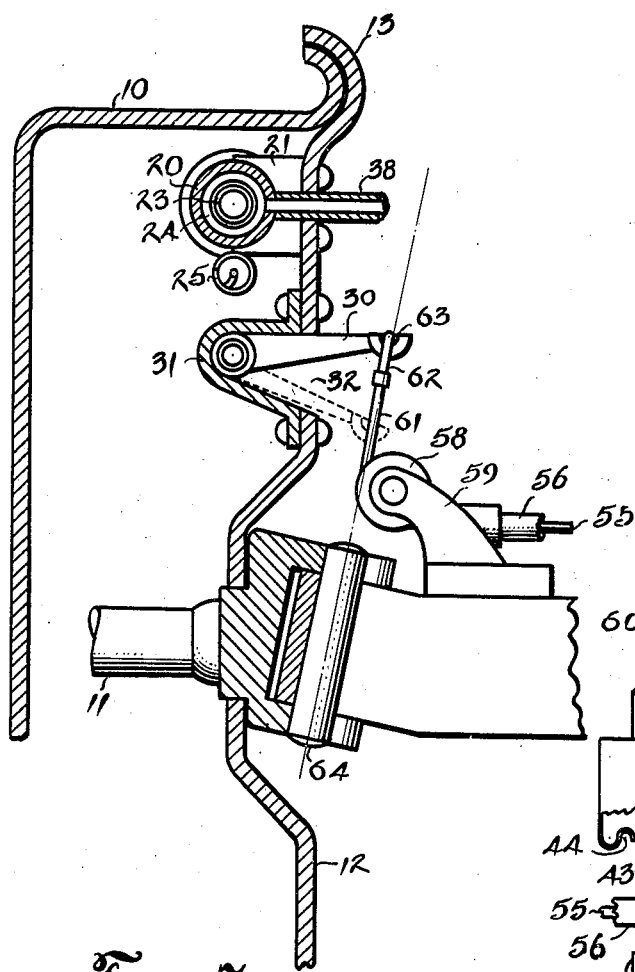
Figure 7 is a fragmentary sectional view along line 7—7 of Figure 1 showing mounting detail.
Figure 8:
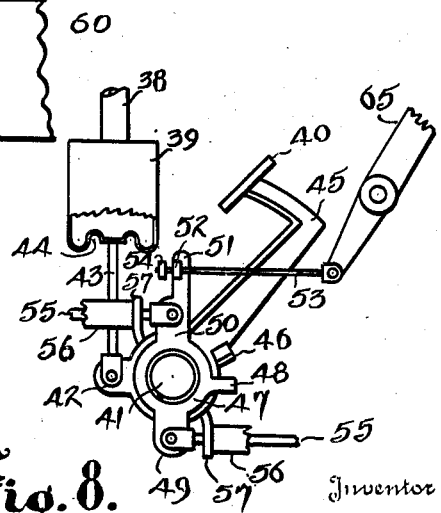
Figure 8 is a fragmentary elevation of the pedal arrangement showing the novel pedal connection means.

Tension spring 99 has one end attached to the central portion of one lever 97 and the other to the other lever 97. A bridle 100 may be used to give clearance if desired or a direct connection as at 101. Spring 99 has a straight control portion 102 which slides with some resistance through mounting 103, Figs. 1 and 6. Spring washer 104 and nut 105 permit adjustment of the ease with which portion 102 slides.

In operation should it be desired to apply the brakes, pedal 40 is depressed, but not sufficiently to cause projection 46 to contact projection 48. Lug 42 raises rod 43 and forces fluid through conduit 38 to cylinder 20 separating pistons 22. Pistons 22 force the upper ends of shoes 14 apart against the action of spring 25. Shoes 14 move outward, pivoting outward at 83 and shoe 15 is forced downward against the action of springs 90 as clearance 17 is taken up. It will be seen that the contact of lining 16 with the inner surface of drum 10 is cushioned and smooth. Contact by the shoes 14 forces shoe 15 downward giving a self energizing braking action with a gradual increase in contact and force.

As the shoes 14 and 15 move outwardly to contact drum 10 webs 18 and 19 and the lever arms 81 pivoted thereon are carried along. Web 18 and the outer side of member 79 separate until the space between end 83 of extension 82 and the face of member 79 is taken up. This space is equal to clearance 17 and at the time of contact of 83 and 79, lining 16 is experiencing braking action against drum 10. As lining 16 experiences wear and becomes thinner, web 18 and lever 82 move closer to drum 10 by the amount of said wear. Since extension 82 and member 79 were in contact, member 79 is likewise moved toward the drum a distance equal to the amount of such wear. In this manner the distance between web 18 and member 79 is maintained equal to original clearance 17 during braking action. It is to be noted that the advance of member 79 takes place continuously as the wear occurs and not in steps. In this respect the adjuster is an improvement over my previous patents. Member 79 carries wedge 70 along with it through the action of bolt 75, the same being true of cover plate 78. As wedge 70 is moved toward drum 10 spring 72 moves wedge 71 away from drum 10. Wedges 70 and 71 experience relative sliding action and the action of wedge 71 effectively prevents any return of wedge 70. It will be seen that when the pedal 40 is released shoes 14 and 15 may move away from drum 10 a distance equal to original clearance 17 regardless of the amount of wear experienced by linings 16 since farther movement is prevented by member 79 which has advanced toward drum 10 by the amount of such wear. Thus the amount of movement of pedal 40 required for a given braking action is the same throughout the life of the lining 16.

During warm weather or because of much braking or both the temperature of drum 10 is frequently raised several hundreds of degrees. The resultant expansion of drum 10 which is of metal causes its inner surface to move away from lining 16 a distance substantially greater than clearance 17 which normally is about $\frac{1}{64}$ of an inch. Such expansion causes a false adjusting action by members 70, 79 and 82 which results in such a reduction of clearance 17 as to cause the linings 16 to drag on drum 10 or to lock and prevent rotation of the wheel entirely. This last is most inconvenient and expensive. Should it occur while the vehicle is in motion it is of course most dangerous.

Accordingly lever 81 is provided with a second extension 84 bearing on plate 85 on thermostatic bellows 87. Bellows 87 is connected with an absorber 88 filled with ether or other fluid having satisfactory characteristics. Tube or absorber 88 is preferably placed on the inner side close to back plate 12 and as near drum 10 as possible. It should be protected from flying particles and the like.

When the temperature of drum 10 is such that over or false correction would occur the fluid in absorber 88 either by expansion of fluid or by turning into a gas causes bellows 87 to expand. The expansion of bellows 87 moves extension 84 away from drum 10 and rocks it about pivot 80. This action moves extension 82 away from member 79 and interrupts adjusting action while the drum 10 is overheated. When drum 10 cools the fluid in absorber 88 likewise cools and extension 82 and member 79 are restored to their former relationship.

As lining 16 wears the effective diameter of the shoe assembly must be maintained. This is accomplished by the action of wedges 94 and 95 in housings 92. When the wearing of lining 16 causes member 79 to move outward it likewise causes wedges 94 to move out of housing 92. Simultaneously wedge 95 is forced inwardly under the action of spring 99 to take its place. Wedge 95 effectively prevents the return of wedge 94 and the combined action of springs 90 and 99 maintains the assembly in position.

Where clearance 17 is $\frac{1}{64}$ of an inch the movement of pistons 22 may be taken as $2\pi\Delta R$ or $\frac{3}{32}$ inch. Where the master cylinder 39 has the same diameter as cylinders 20 the total movement of rod 43 need not be much more than $\frac{3}{8}$ inch to take care of all four brakes. A clearance of $\frac{1}{32}$ inch would require only $\frac{3}{4}$ of an inch movement.

If for any reason the hydraulic system fails to act continued depression of pedal 40 causes projection 46 to contact projection 48 which causes clockwise rotation of members 47. Rotation of member 47 exerts a pull on cables 55 which, acting through equalizing leverage rotates lever 30. Lever 30 acting through threaded portions 34 and 35 causes depending arms 27 to separate as do also the tops of shoes 14. Elongate slot 29 allows free movement without disturbing pistons 22. A spring or like means is used to return pedal 40.

Member 47 may also be actuated by emergency or parking lever 65 which acts through rod 53 slidably fastened at 52 on extension 51 of member 47.

It will be noted that cylinder 20 serves as an anchor for the shoes 14. Pistons 22 rest on the rounded shoulders at the ends of cylinder 20. In this position all adjustment stops. This rounded shoulder bears and centers the initial thrust due to the braking action. Depending upon the direction of rotation one end or the other of the cylinder 20 is utilized.

It will be seen that there are two distinct adjusting operations. First, when the brakes are applied adjuster elements 70, 79 are drawn out as needed to correct for the wear of linings 16. While the brakes are thus expanded the adjustment of wedge members 94, 95 for length cannot occur since the braking action forces these wedge members firmly together.

Upon the release of pedal 40 springs 90 lift shoe 15 through web 19 away from drum 10 until it rests against adjuster block or member 79. Spring 25 performs a like function for shoes 14. This action of spring 25 withdraws wedge 94 slightly from housing 92 if wedge 70 has been advanced toward drum 10 to correct for wear of lining 16. Relative movement of wedge member 94 and 95 continues until pistons 22 rest on the rounded shoulders at the ends of cylinder 20. Spring 25 must be strong enough to accomplish this action and cause firm seating of the pistons in the cylinder. Proper clearance between the drum 10 and linings 16 is thereby assured. Spring 25 thus has the triple function of eliminating loose play, releasing the brakes and causing the adjustment for length by drawing the upper shoes 14 out of housing 92 in shoes 15 where linings 16 wear and the shoes 14 and 15 become too short to return the pistons 22 to normal position against the shoulders of cylinder 20.

I claim:

1. In a vehicular brake, a drum, a shoe mounted in close proximity thereto, adjusting means operatively connected to said shoe, a portion of said adjusting means being movable with said shoe upon the occurrence of wear, means connected to said shoe for moving it toward said drum, a second portion of said adjusting means being wedge shaped and constructed to positively hold said first portion in an advanced position, thermally controlled means associated with said adjusting means and arranged to arrest its motion whereby adjustment is interrupted during periods of substantial drum expansion due to temperature rise.

2. In a vehicular brake, a drum, a shoe mounted adjacent said drum with a certain running clearance therebetween, adjusting means operatively connected to said shoe, a portion of said adjusting means being movable with said shoe upon the occurrence of wear, brake applying means connected to said shoe, a second portion of said adjusting means being wedge shaped and arranged to positively hold said first portion in an advanced position, said adjusting means being so constructed that said shoe may be moved away from said drum by the amount of said clearance and there held, controlling means associated with said adjusting means and arranged to interrupt the operation thereof whereby adjustment is interrupted during periods of substantial drum expansion or shoe shrinkage from whatever cause.

3. The combination set forth in claim 2, said controlling means constructed to engage said adjusting means and move it out of adjusting position during periods when said clearance is greater than normal due to causes other than wear of said shoe.

4. The combination set forth in claim 2, said controlling means comprising an elongated thermally sensitive chamber disposed along said shoe.

5. The combination set forth in claim 2, said adjusting means comprising said movable portion adapted to contact said shoe and having an offset wedge shaped portion fixed thereto, a wedge element bearing against said wedge shaped portion in unidirectional locking relation and an arm mounted on said shoe and arranged to bear against and move said movable portion should said clearance exceed a certain amount.

6. In a vehicular brake, a drum, a plurality of shoes, means connected to said shoes comprising mating wedges in a wedge shaped housing whereby their combined effective length may be increased to allow for wear, said wedge shaped housing being constructed and cooperating with said wedge shaped members so nicely that an adjustment advance however small is firmly held without slip.

7. In a vehicular brake, a drum, a plurality of shoes, interfitting wedge shaped members in a wedge shaped housing connecting said shoes in a slidable manner whereby the combined effective length of said shoes may be increased to allow for wear, said wedge shaped housing being constructed and cooperating with said wedge shaped members so nicely that an adjustment advance however small is firmly held without slip.

8. The combination set forth in claim 7, said interfitting wedge shaped members providing locking action against the walls of said housing whereby said sliding is unidirectional and resilient means urging one of said wedge shaped members into said housing.

9. In combination, an adjusting means for a vehicular brake comprising a brake shoe, a base member, a wedge shaped movable member mounted on said base member, locking means positively limiting any unwanted movement of said movable member, brake shoe contact means mounted on said movable member, a pivoted contact arm mounted on said brake shoe and arranged to engage and move said contact means to effect adjustment, said contact arm being movable into and out of engaging relation with said contact means.

10. In combination, an adjusting means for a vehicular brake, having a drum and a shoe, comprising a base member, a movable member mounted on said base member, unidirectional locking means adjacent said movable member and limiting only the return movement thereof, contact means mounted on said movable member, a pivoted contact arm mounted on said shoe and arranged to contact and move said contact means to effect adjustment, a normal clearance between said arm and said contact means substantially equal to the normal clearance between said shoe and said drum.

11. The combination set forth in claim 10, said contact arm being movable into and out of contact relation with said contact means, a projection on said contact arm, thermally responsive means mounted adjacent said contact arm and acting on said projection whereby said arm may be rotated into and out of operative position with respect to said contact member.

12. The combination set forth in claim 10, a second shoe, shoe lengthening means mounted on said shoes having interfitting wedge shaped parts on adjacent shoe portions whereby an effective total length of said shoes may be maintained.

EDWARD J. NACHTWEY.